Apr. 10, 1923.
W. BROTHER
FLUID CLUTCH MECHANISM
Filed May 21, 1920      2 sheets-sheet 1
1,451,139
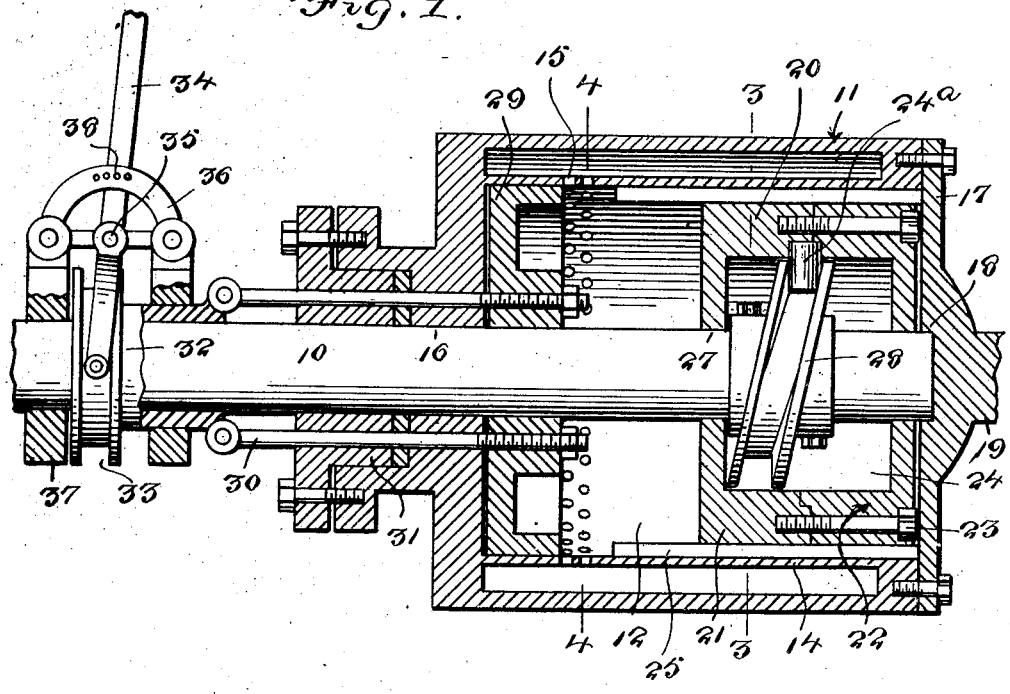
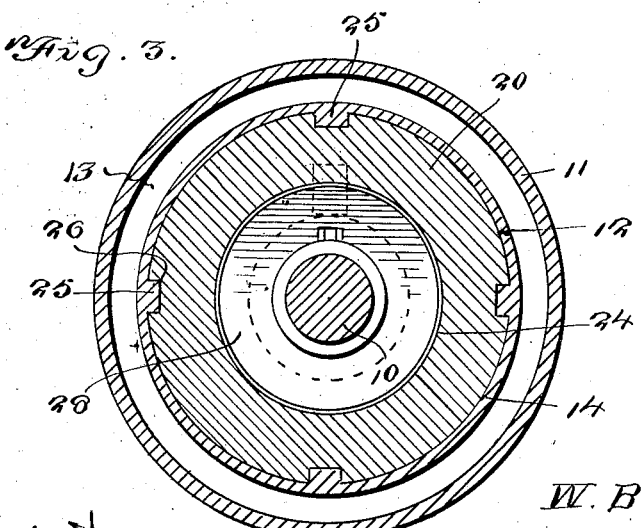
W. Brother
INVENTOR
BY Victor J. Evans
ATTORNEY

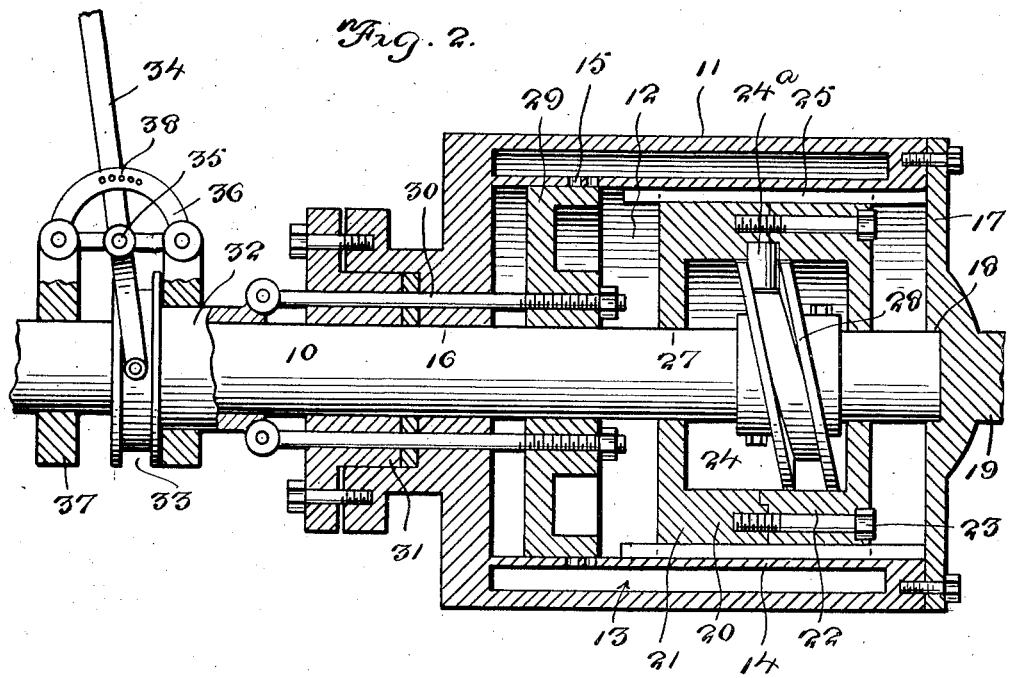

Patented Apr. 10, 1923.

1,451,139

UNITED STATES PATENT OFFICE.

WILLIAM BROTHER, OF SALT LAKE CITY, UTAH.

FLUID CLUTCH MECHANISM.

Application filed May 21, 1920. Serial No. 383,209.

*To all whom it may concern:*

Be it known that I, WILLIAM BROTHER, a citizen of the United States, residing at Salt Lake City, in the county of Salt Lake and State of Utah, have invented new and useful Improvements in Fluid Clutch Mechanism, of which the following is a specification.

This invention relates to speed regulating devices and has for an object the provision of means for regulating the transmission of power from a drive to a driven shaft, the invention being adapted for use in connection with the driving mechanism of an automobile, or with machines of various characters.

Another object of the invention is the provision of a power transmitting device employing oil or other liquid as a means for regulating the degree of speed between the drive and driven shafts, novel means being provided for controlling the fluid to increase or decrease the fluid resistance and vary the speed of rotation of the driven shaft.

With the above and other objects in view, the invention further includes the following novel features and details of construction, to be hereinafter more fully described, illustrated in the accompanying drawings and pointed out in the claim hereunto appended.

In the drawings:

Figure 1 is a sectional view of the invention showing the device in neutral position.

Figure 2 is a similar view with the valve in position to transmit power from the drive to the driven shaft.

Figure 3 is a transverse sectional view on the line 3—3 of Figure 1.

Figure 4 is a similar view on the line 4—4 of Figure 1.

Referring to the drawings in detail, like characters of reference denote corresponding parts throughout the several views.

In illustrating the invention, there is shown at 10 a drive shaft, which may be operated from any suitable source of power and may be connected thereto in any desired manner. Mounted upon the end of the drive shaft 10 is a cylinder 11 which is divided into separate chambers 12 and 13, by means of a concentrically arranged partition 14. These chambers communicate with one another through the medium of a plurality of openings 15 formed in the partition 14. One end of the cylinder is closed and is provided with an opening 16 for the passage of the shaft 10 and its opposite end is provided with a removable head 17 in which is formed a bearing 18 of suitable character for the inner extremity of the shaft 10. The head 17 has secured thereto a shaft 19 which is the driven shaft and which may be connected to a mechanism of any character.

Mounted within the chamber 12 is a piston 20, the latter being preferably formed in separate sections 21 and 22, connected together by screws or bolts 23, each of these sections being hollowed out as shown, to provide an opening 24. The piston 20 is movable longitudinally within the chamber 12 but is held against relative rotation through the medium of keys or lugs 25 which are carried by the partition 14 and operate in guide slots 26 provided upon the periphery of the piston.

The shaft 10 passes through openings 27 provided in the opposite walls of the opening 24 and located within this last mentioned opening and secured to the shaft 10 is a grooved cam 28. Fitting within a socket formed in the piston and projecting into the opening 24 is a pin 24$^a$ which forms a roller for operation within the groove of the cam 28. When the shaft 10 is rotated the pin operating within the cam groove will reciprocate the piston longitudinally of the cylinder the distance of the throw of the cam. This will cause the oil or other fluid within the chambers 12 and 13 to circulate within said chambers through the openings 15.

For the purpose of regulating the passage of the fluid through the openings 15 so as to increase or decrease the resistance against which the piston operates, there is provided a valve 29. This valve is shown in the form of a flanged disk and is slidable on the shaft 10 longitudinally of the chamber 12 to cover and uncover the openings 15 to increase and decrease the number of these openings for the passage of the fluid. Secured to the valve 29 are rods 30, these rods extending through the end of the cylinder and through a stuffing box or gland 31, through which the shaft 10 also passes. The outer ends of the rods 30 are secured to a sleeve 32 which is provided with an annular groove 33 for engagement with the forked end of a controlling lever 34. The lever 34 is pivotally mounted as shown at 35 upon a bracket 36, the latter being carried by spaced collars 37 which are stationary and through which the sleeve 32 and the shaft 10 pass.

By moving the lever 34 upon its pivot, the sleeve 32 may be moved longitudinally of the shaft 10 so as impart to the desired movement to the valve 29 to regulate the passage of oil through the openings 15. The lever 34 may be held in adjusted position through the medium of a suitable stop which engages the opening 38 provided in the bracket 36. When the parts are in a position shown in Figure 1 of the drawings, no movement will be imparted to the shaft 19, as the fluid will be permitted free passage through the openings 15 as the piston 20 is operated. When the valve 29 is moved toward the piston by the operating lever 34, the passage of the fluid through the openings 15 will be obstructed in proportion to the movement of the valve and this will impart a proportionate resistance to the operation of the piston 20 and will rotate the cylinder 11 in a speed proportionate to the amount of such resistance.

The invention is susceptible of various changes in its form, proportions and minor details of construction, and the right is herein reserved to make such changes as properly fall within the scope of the appended claim.

Having described the invention what is claimed is:—

A fluid transmission device comprising a cylinder divided into separate fluid containing compartments, having communicating openings therebetween, a shaft connected to one end of the cylinder, a drive shaft rotatably mounted within the cylinder, a piston formed of separate cup shaped sections, means by which said sections may be secured together to provide a chamber within the piston, means located within the chamber and operated by the drive shaft for moving the piston longitudinally of the cylinder and means for controlling communication between the cylinder compartments to regulate the passage of fluid therebetween.

In testimony whereof I affix my signature.

WM. BROTHER.